US012706368B2

(12) United States Patent
Tatara et al.

(10) Patent No.: US 12,706,368 B2
(45) Date of Patent: Aug. 11, 2026

(54) ANTENNA DEVICE AND ARTIFICIAL SATELLITE

(71) Applicant: ArkEdge Space Inc., Tokyo (JP)

(72) Inventors: Asuka Tatara, Tokyo (JP); Hiroshi Yano, Tokyo (JP)

(73) Assignee: ArkEdge Space Inc., Tokyo (JP)

( * ) Notice: Subject to any disclaimer, the term of this patent is extended or adjusted under 35 U.S.C. 154(b) by 0 days.

(21) Appl. No.: 19/140,754

(22) PCT Filed: Nov. 27, 2024

(86) PCT No.: PCT/JP2024/042043
§ 371 (c)(1),
(2) Date: Jun. 18, 2025

(87) PCT Pub. No.: WO2025/229776
PCT Pub. Date: Nov. 6, 2025

(65) Prior Publication Data

US 2026/0058351 A1 Feb. 26, 2026

(30) Foreign Application Priority Data

Apr. 30, 2024 (JP) ................................ 2024-073438

(51) Int. Cl.
*H01Q 1/08* (2006.01)
*H01Q 1/28* (2006.01)

(52) U.S. Cl.
CPC ................ *H01Q 1/08* (2013.01); *H01Q 1/28* (2013.01)

(58) Field of Classification Search
CPC .................................. H01Q 1/08; H01Q 1/28
See application file for complete search history.

(56) References Cited

U.S. PATENT DOCUMENTS

2018/0331433 A1 11/2018 Ceely et al.
2019/0277051 A1 9/2019 Reveles et al.
2023/0411821 A1 12/2023 Ruhl et al.

FOREIGN PATENT DOCUMENTS

JP H09-307339 A 11/1997
JP 7040874 B2 3/2022

*Primary Examiner* — Graham P Smith
(74) *Attorney, Agent, or Firm* — Foley & Lardner LLP

(57) ABSTRACT

To enable element holders to be arranged so as to be positioned at predetermined intervals when deployed. An antenna device 1 can be in an accommodated state of being accommodated in a casing and in a deployed state of extending to an outside from the casing. The antenna device 1 includes an extension shaft member 20 accommodated in a casing 10 in a state of being retracted in an axial direction, a plurality of element holders 30 each including an opening and stacked in the casing 10 in a state of the extension shaft member 20 being inserted through the openings, an antenna element 40 deployably held by the element holder 30, and a holding member that couples the plurality of element holders 30 to each other.

13 Claims, 10 Drawing Sheets

ANTENNA DEVICE AND ARTIFICIAL SATELLITE

TECHNICAL FIELD

The present invention relates to an antenna device and an artificial satellite.

BACKGROUND ART

An artificial satellite is equipped with an antenna device for transmitting and receiving radio signals. Since the antenna device is very large in a deployed state, at the time of launching a rocket, the antenna device is mounted on the rocket in a state of being stored in a compact manner, and when the rocket reaches outer space, the antenna device is expanded into the deployed state. As such an antenna device, for example, Patent Document 1 discloses an antenna structure using a support structure in which a plurality of openings are formed in a cylindrical main body to form foldable tape spring hinges. The support structure is deployable as a result of the tape spring hinges generating a force that urges the support structure to be in a deployed state.

CITATION LIST

Patent Literature

Patent Document 1: JP 7040874 B

SUMMARY OF THE INVENTION

Technical Problem

In order to efficiently transmit and receive radio waves, instead of a simple rod-like structure, an antenna protruding sideways is required to obtain a cross Yagi antenna in which radio wave intensity is constant and which is compatible with circularly polarized waves. In many cases, the polarized waves are constantly changing due to changes in a relative position and angle of an artificial satellite with respect to the surface of the earth. In order to always transmit and receive the radio waves in a stable manner while dealing with such changes, the above-described antenna is required. Further, since intervals between the elements affect the performance gain (communication efficiency of an antenna) and the reception frequency, the intervals between the elements are designed to achieve a desired frequency and communication efficiency. When it is intended to provide antenna elements protruding sideways by using such a support structure, the antenna elements need to be arranged so as to be positioned at designed predetermined intervals when deployed.

The present invention has been made in light of the above-described problems, and an object of the present invention is to enable antenna elements to be arranged so as to be positioned at designed predetermined intervals when deployed.

Means for Solving the Problem

According to an aspect of the present invention, an antenna device can be in an accommodated state of being accommodated in a casing and in a deployed state of extending to an outside from the casing. The antenna device includes an extension shaft member accommodated in the casing in a state of being retracted from an opening of the casing in an axial direction, a plurality of element holders each including an opening and stacked in the casing in a state of the extension shaft member being inserted through the opening, an antenna element deployably held by the element holder, and a holding member configured to couple the plurality of element holders to each other.

According to an aspect of the present invention, the holding member is formed of a string.

According to an aspect of the present invention, the extension shaft member is formed of a convex tape.

According to an aspect of the present invention, the extension shaft member is formed by superposing a pair of the convex tapes so as to face each other.

According to an aspect of the present invention, the antenna device further includes a power supply board disposed at at least one of the element holders.

According to an aspect of the present invention, the antenna device further includes a power supply cable extending from the casing to the power supply board, and the power supply cable is disposed along the extension shaft member.

According to an aspect of the present invention, the antenna element includes a convex tape.

According to an aspect of the present invention, the casing includes a casing main body including an opening on one side of the casing main body, and an opening/closing lid rotatably connected to the casing main body and capable of closing the opening, and a central axis of the extension shaft member is displaced from a central axis of the casing.

According to an aspect of the present invention, an opening mechanism accommodation portion and an element accommodation portion are formed in the casing, the opening mechanism accommodation portion housing an opening portion configured to open an opening/closing lid, and the element accommodation portion housing the element holders, and the opening mechanism accommodation portion and the element accommodation portion are provided in an upper portion of the casing.

According to an aspect of the present invention, a power supply cable accommodation portion and an extension shaft member accommodation portion are formed in the casing, the power supply cable accommodation portion housing a power supply cable configured to supply power to a power supply board attached to the antenna element, and the extension shaft member accommodation portion housing the extension shaft member, and the power supply cable accommodation portion and the extension shaft member accommodation portion are provided in a lower portion of the casing.

According to an aspect of the present invention, a central axis of the extension shaft member is closer than a central axis of the casing to a rotation shaft of the opening/closing lid.

According to an aspect of the present invention, the element holders are fixed to the holding member to cause a distance between locations at which the element holders adjacent to each other are attached to the holding member to be a preset interval.

According to an aspect of the present invention, an artificial satellite including the antenna device described above is provided.

Advantageous Effects of Invention

According to the present invention, antenna elements can be arranged so as to be positioned at designed predetermined intervals when deployed.

DESCRIPTION OF EMBODIMENTS

Hereinafter, an embodiment of an antenna device and an artificial satellite according to the present invention will be described in detail with reference to the drawings. Note that, in the following description, descriptions related to the vertical direction such as upward and downward are used for convenience of description, and the posture of the antenna device may be any posture.

Figure 1:
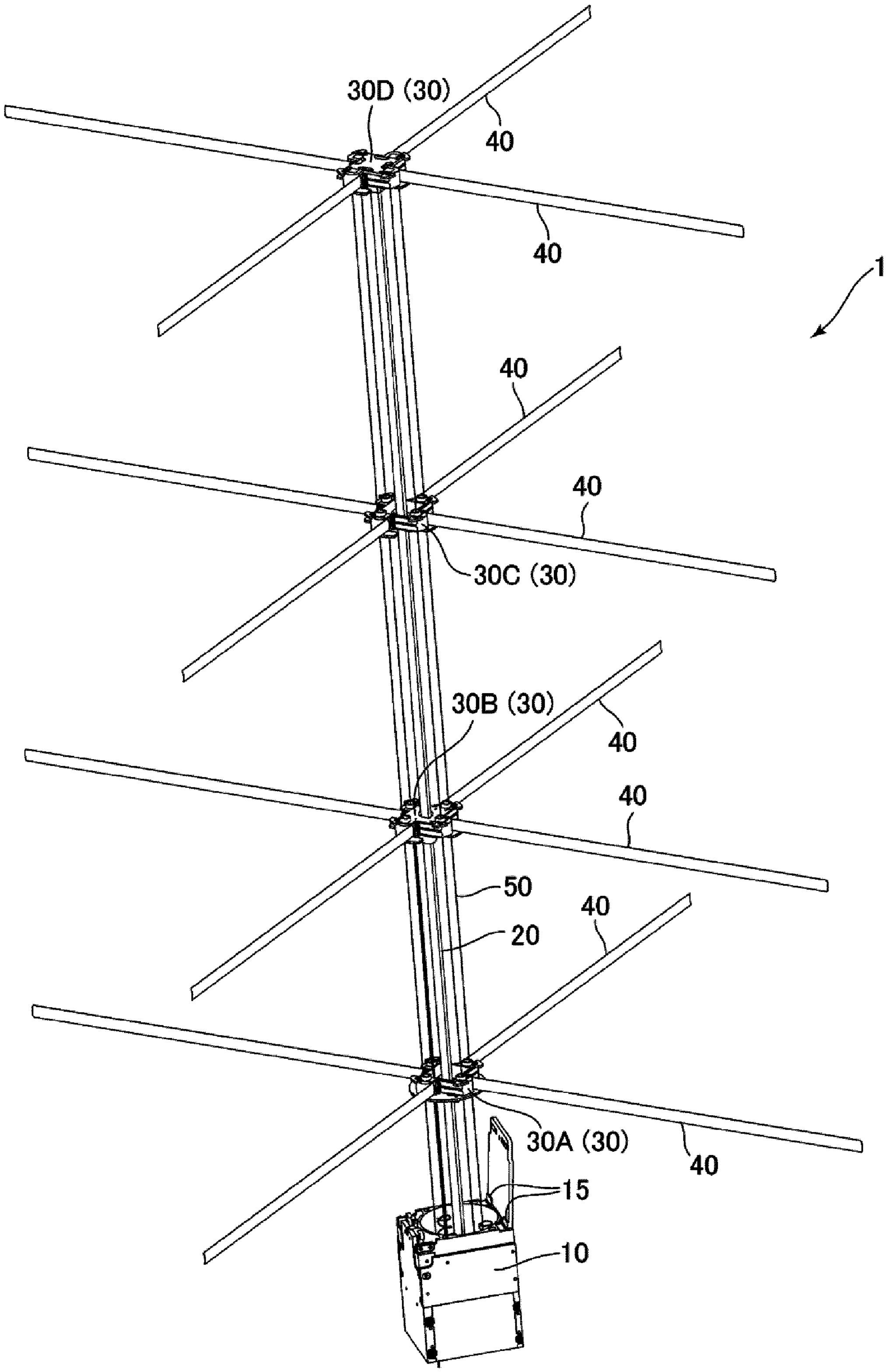
FIG. 1 is a perspective view illustrating an appearance of an antenna device according to an embodiment of the present invention in a deployed state.
Figure 2:
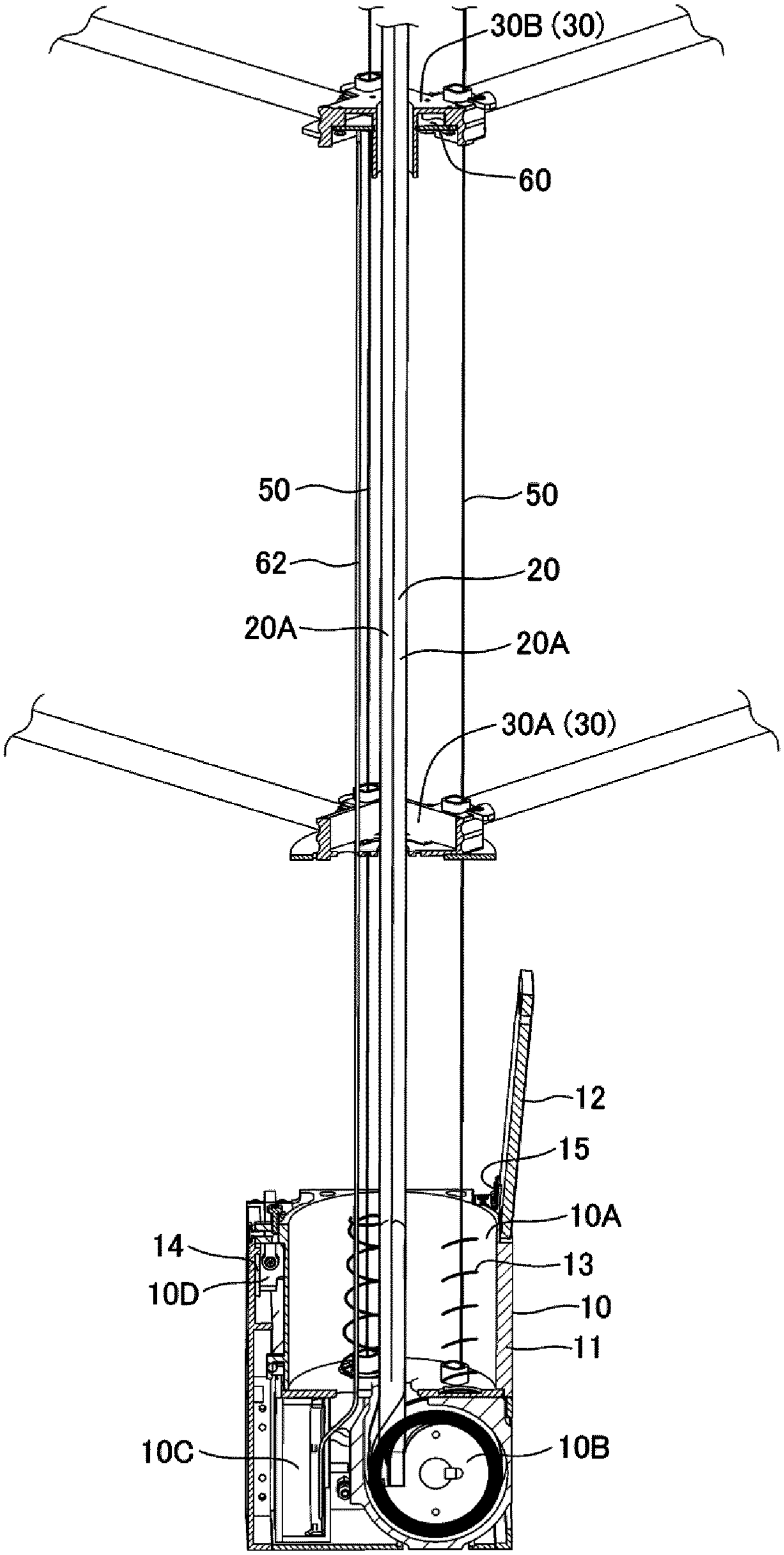
FIG. 2 is an enlarged perspective view of the antenna device according to the embodiment of the present invention in the deployed state.

FIG. 1 is a perspective view illustrating an appearance of an antenna device according to an embodiment of the present invention in a deployed state. FIG. 2 is an enlarged perspective view of the antenna device according to the embodiment of the present invention in the deployed state.

Figure 3:
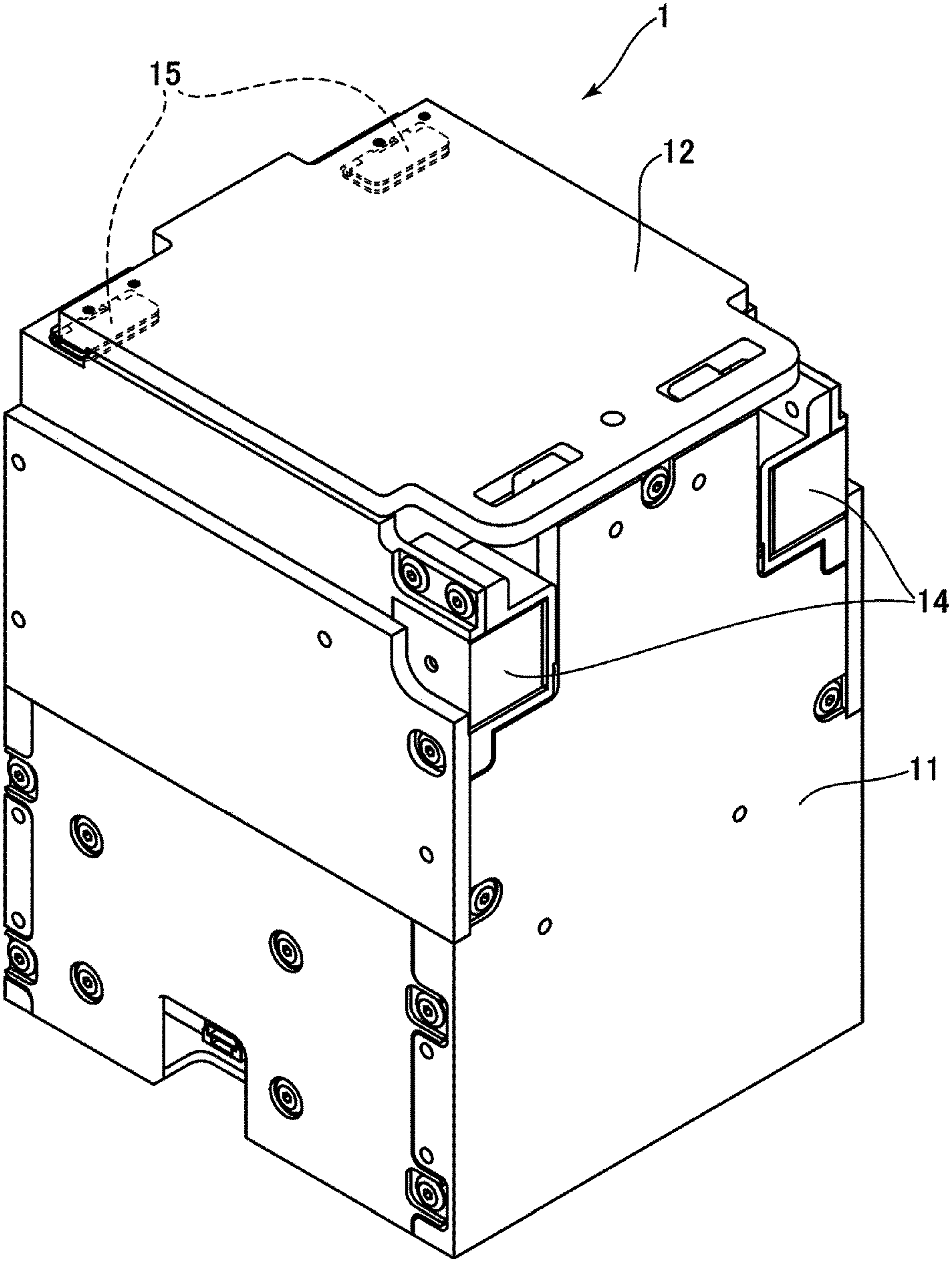
FIG. 3 is a perspective view illustrating an appearance of the antenna device according to the embodiment of the present invention in an accommodated state.
Figure 4:
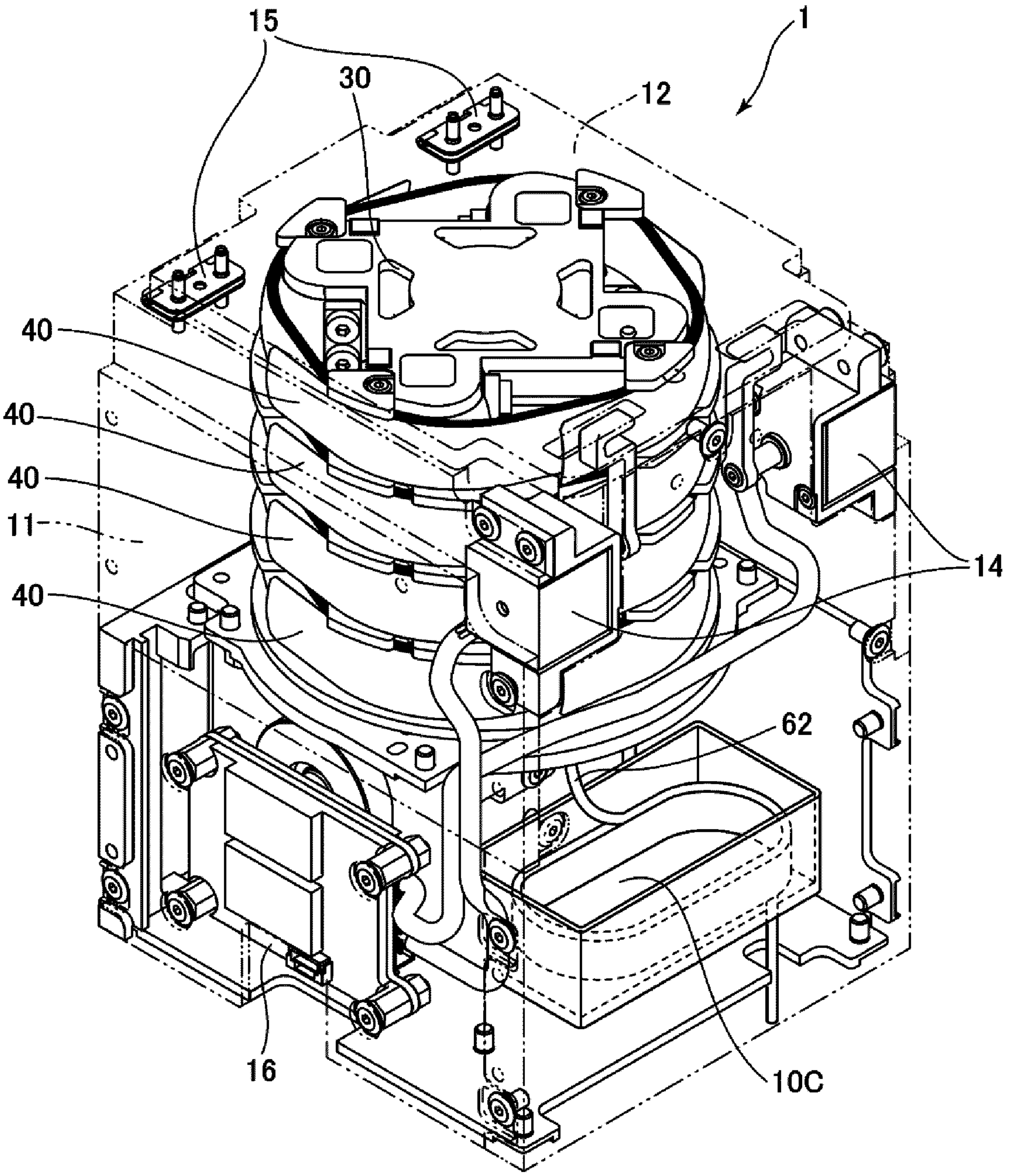
FIG. 4 is a perspective view illustrating an internal configuration of the antenna device according to the embodiment of the present invention in the accommodated state.
Figure 5:
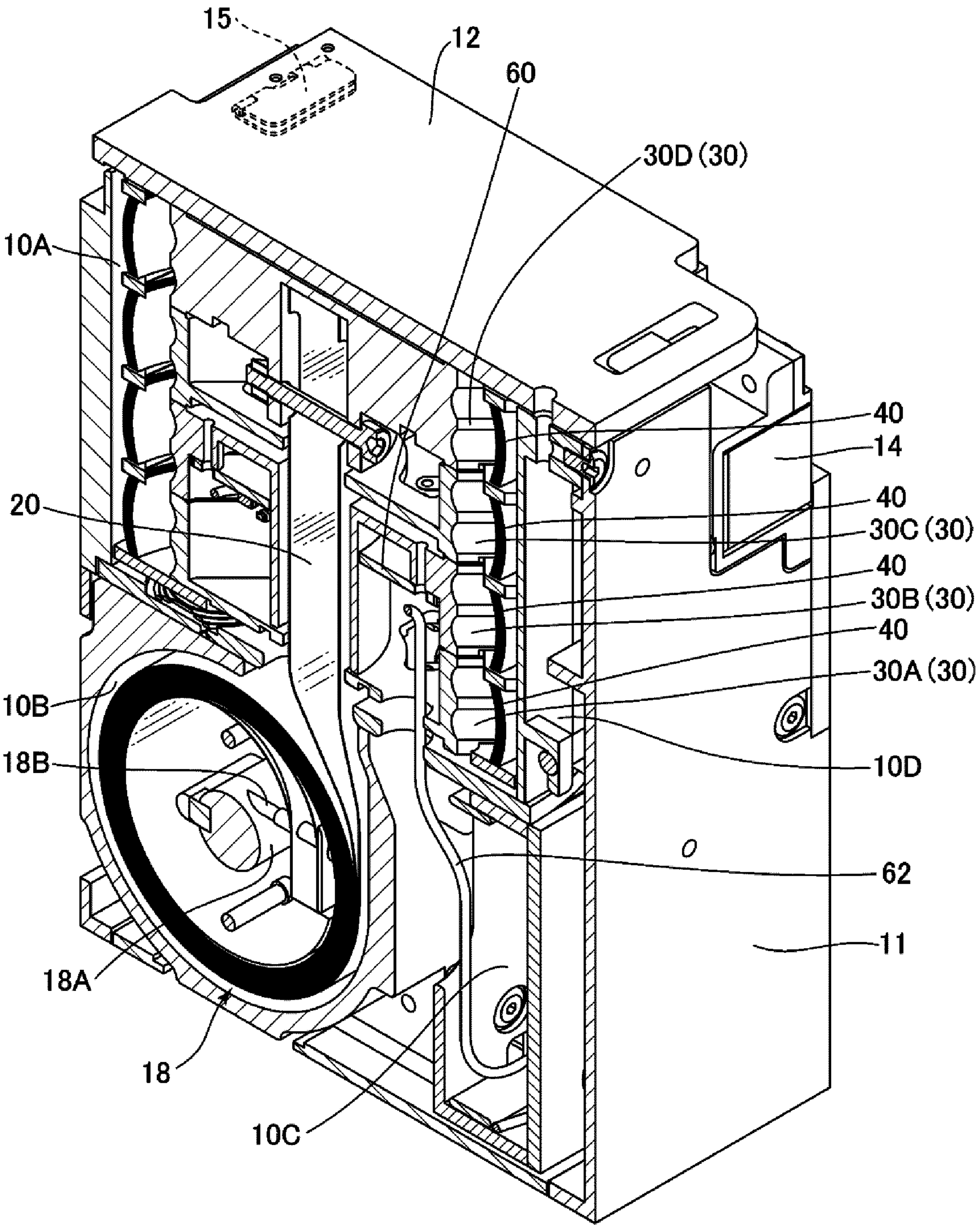
FIG. 5 is a vertical cross-sectional view illustrating the internal configuration of the antenna device according to the embodiment of the present invention in the accommodated state.
Figure 6:
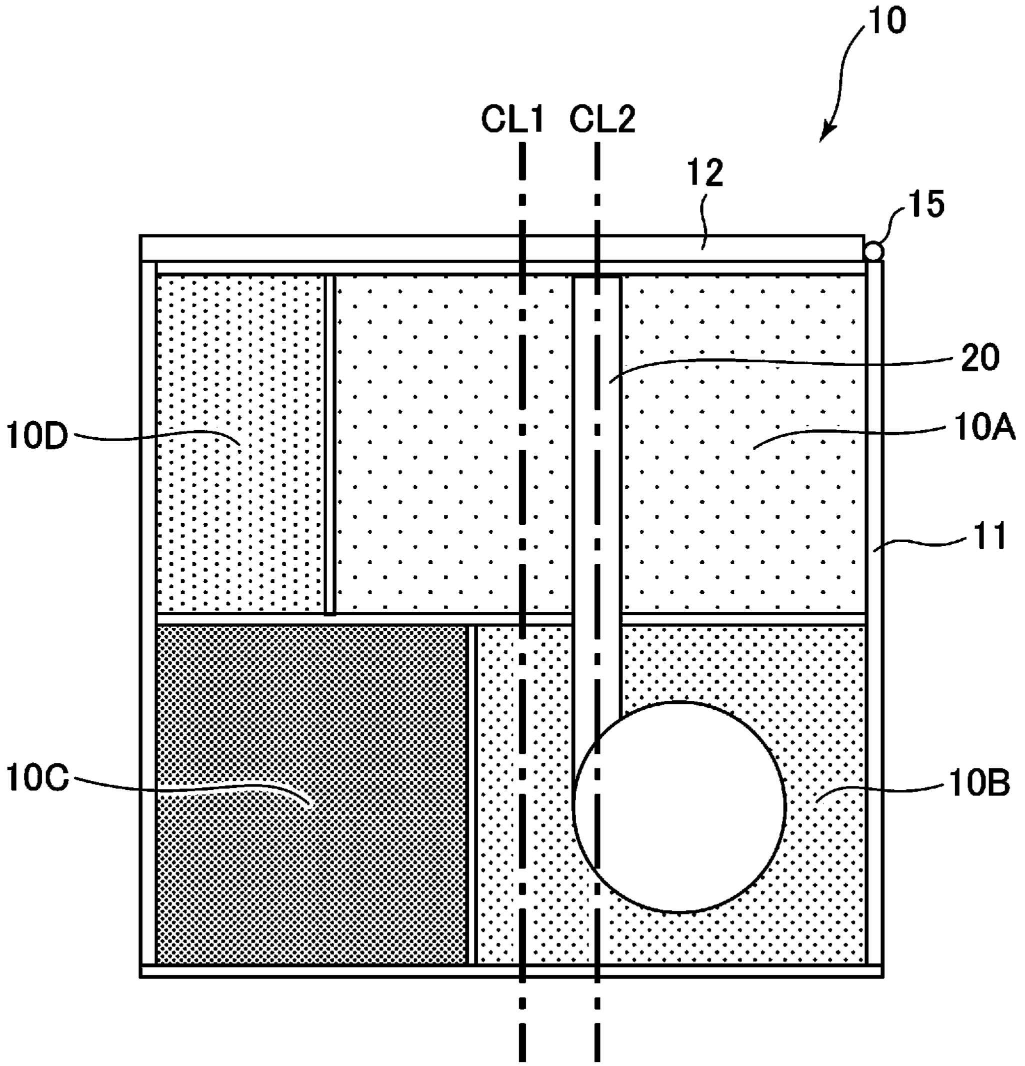
FIG. 6 is a schematic view illustrating accommodation portions of each of members in the antenna device according to the embodiment of the present invention in the accommodated state.

FIG. 3 is a perspective view illustrating an appearance of the antenna device according to the embodiment of the present invention in an accommodated state. FIG. 4 is a perspective view illustrating an internal configuration of the antenna device according to the embodiment of the present invention in the accommodated state. FIG. 5 is a vertical cross-sectional view illustrating the internal configuration of the antenna device according to the embodiment of the present invention in the accommodated state. FIG. 6 is a schematic view illustrating accommodation portions of each of members in the antenna device according to the embodiment of the present invention in the accommodated state.

An antenna device 1 according to the present embodiment is embedded in an artificial satellite and is a device for transmitting and receiving radio waves. The antenna device 1 can be in an accommodated state in which an antenna is housed in a casing 10 and in an extended state in which the antenna extends from the casing 10.

As illustrated in FIGS. 1 and 2, the antenna device 1 includes the casing 10, an extension shaft member 20, a plurality of element holders 30, antenna elements 40 connected to the element holders 30, and a holding member 50.

As illustrated in FIG. 3, the casing 10 includes a casing main body 11 and an opening/closing lid 12 connected to the casing main body 11. The casing main body 11 has a rectangular parallelepiped shape in which one surface is open. The opening/closing lid 12 is rotatably attached to the edge of the opening of the casing main body 11 with a hinge 15 serving as a rotation shaft. In this way, the opening/closing lid 12 can be in a state in which the opening of the casing main body 11 is closed and a state in which the opening of the casing main body 11 is open. In the accommodated state, the opening/closing lid 12 closes the opening of the casing main body 11, and in the deployed state, the opening/closing lid 12 opens the opening of the casing main body 11. The hinge 15 is spring-loaded and urges the opening/closing lid 12 to open.

As illustrated in FIGS. 1 and 2, in the deployed state, the extension shaft member 20 extends linearly in an axial direction from the inside of the casing 10. The extension shaft member 20 is formed of a pair of metal convex tapes 20A. The convex tape 20A is a thin plate-shaped member having an arc-shaped cross section and extending linearly. By releasing a fixing force from a coiled state, a restoring force acts on the convex tape 20A to restore the convex tape 20A to the linear state. In the present embodiment, the extension shaft member 20 is formed by superposing the pair of convex tapes 20A so that concave surface sides thereof face each other and both side edges thereof are connected to each other.

The plurality of element holders 30 are arranged at predetermined intervals set by design, respectively, along the extension shaft member 20 in the deployed state. The element holder 30 is held in position by the holding member 50 in the deployed state, but is movable along the extension shaft member 20 during the transition from a contracted state to the deployed state. In the present embodiment, four of the element holders 30 are arranged along the extension shaft member 20. The element holder 30 is a plate-like member made of a resin, for example. The fourth element holder 30 located at the fourth position from the casing 10 (the position closest to the tip) is fixed to the tip of the extension shaft member 20. Further, an opening 304 (FIG. 7) is formed at the center of each of the first to third element holders 30 located at the first to third positions from the casing 10, respectively. The extension shaft member 20 can be inserted into the openings 304. The extension shaft member 20 is inserted into the opening 304 of each of the element holders 30.

In the deployed state, the antenna elements 40 extend linearly outward from the element holder 30 in a direction perpendicular to a direction (axial direction) in which the extension shaft member 20 extends. Each of the antenna elements 40 is made of a single sheet of a metal convex tape. Four of the antenna elements 40 are connected to each of the element holders 30. In the deployed state, the four antenna elements 40 connected to each of the element holders 30 are arranged at equal angular intervals (90°) so as to extend perpendicularly to the axial direction. That is, the antenna elements 40 extend so as to form a cross shape in a plane perpendicular to the axial direction.

The holding member 50 is made of a flexible filament such as a string and is fixed to each of the element holders 30. The positions at which the element holders 30 are attached to the holding member 50 are set at predetermined intervals. Further, an end portion of the holding member 50 is fixed to a bottom portion of an element accommodation portion 10A in the casing 10. In this way, when the extension shaft member 20 deforms in transition from the accommodated state to the deployed state, the intervals between the element holders 30 are maintained at the predetermined intervals. Here, the term predetermined intervals does not mean equal intervals, but means preset intervals by design. Since the intervals between the antenna elements 40 affect the performance gain (communication efficiency of the antenna) and the reception frequency, the intervals between the antenna elements 40 are designed to achieve a desired frequency and communication efficiency. In the present embodiment, in a state in which the string constituting the holding member 50 is tensioned, the positions at which the element holders 30 are attached to the holding member 50 are adjusted so that the interval between the first element holder 30 and the second element holder 30, the interval between the second element holder 30 and the third element holder 30, and the interval between the third element holder 30 and the fourth element holder 30 are set to the predetermined intervals, respectively. Further, a part of the extension shaft member 20 is held in an extension shaft member accommodation portion 10B without being extended, and holds an extending force for extending in the axial direction. In this way, the string, that is, the holding member 50 is always kept in a tensioned state, and because the above-described extending force exists, the string does not sag. Thus, the set predetermined intervals can be stably maintained. In an antenna in which the antenna is formed simply based on the free length of a spring, the overall length may change due to a disturbance such as movement of a satellite. However, the above-described configuration has a structure that is strong against such a disturbance. Thus, the intervals between portions of the holding member 50 to which adjacent ones of the element holders 30 are fixed are set to predetermined distances. Note that, although four of the holding members 50 are provided in the present embodiment, the configuration is not limited to this example, and it is sufficient that at least one of the holding members 50 be provided. With such a configuration, the antenna device 1 constitutes a cross Yagi antenna in the deployed state.

As illustrated in FIG. 2, an antenna power supply board 60 is attached to a second element holder 30B, which is the second element holder 30 from the casing 10. Further, one end of a power supply cable 62 extending from the inside of the casing 10 is connected to the antenna power supply board 60. The other end of the power supply cable 62 extends to the outside of the antenna device 1 and is electrically connected to another board in the artificial satellite, and electric signals are supplied to the antenna power supply board 60 via the power supply cable 62.

The power supply cable 62 extends from the inside of the casing 10 to the second element holder 30B along the extension shaft member 20. In this way, the antenna elements 40 connected to a first element holder 30A, which is the first element holder 30 from the casing 10, function as reflectors, the antenna elements 40 connected to the second element holder 30B, which is the second element holder 30 from the casing 10, function as radiators, and the antenna elements 40 connected to third and fourth element holders 30C and 30D, which are the third and fourth element holders 30 from the casing 10, function as wave directors.

Note that although four of the element holders 30 are provided in the present embodiment, the third and fourth element holders 30C and 30D may be omitted, and five or more of the element holders 30 may be provided. As long as the antenna device 1 includes a plurality of the element holders 30 to which the antenna elements 40 are connected, the antenna device 1 can function as an antenna device.

As illustrated in FIGS. 4 to 6, the element accommodation portion 10A, the extension shaft member accommodation portion 10B, a power supply cable accommodation portion 10C, and an opening mechanism accommodation portion 10D are formed in the casing 10. The element accommodation portion 10A is a space that opens upward, and the opening on the upper side is closed by the opening/closing lid 12 in the accommodated state. In addition, a spring 13 (FIG. 2) is attached to the bottom portion of the element accommodation portion 10A.

The extension shaft member accommodation portion 10B is disposed below the element accommodation portion 10A. An opening is formed so as to connect a space between the element accommodation portion 10A and the extension shaft member accommodation portion 10B, and the extension shaft member 20 housed in the extension shaft member accommodation portion 10B extends into the element accommodation portion 10A through the opening.

An extension shaft member accommodation device 18 is provided in the extension shaft member accommodation portion 10B. The extension shaft member accommodation device 18 is a device that winds and houses the extension shaft member 20. The extension shaft member accommodation device 18 includes a rotatable shaft portion 18A, and one end of the extension shaft member 20 is connected to a coupling member 18B fixed to the shaft portion 18A. In the accommodated state, the extension shaft member 20 is housed in the casing 10 in a state of being wound around the shaft portion 18A. The extension shaft member accommodation device 18 is configured to restrict the rotation of the shaft portion 18A when the opening/closing lid is closed.

The power supply cable accommodation portion 10C is disposed below the element accommodation portion 10A and on a side of the extension shaft member accommodation portion 10B. An opening is formed so as to connect a space between the power supply cable accommodation portion 10C and the element accommodation portion 10A, and the power supply cable 62 extends into the element accommodation portion 10A through the opening.

Further, as illustrated in FIG. 4, the antenna device 1 includes an opening portion 14 that opens the opening/closing lid 12, and an opening portion drive substrate 16 that drives the opening portion 14. The opening portion 14 is housed in the opening mechanism accommodation portion 10D. In the accommodated state, the opening portion 14 holds the opening/closing lid 12 in a closed state. When the opening portion drive substrate 16 drives the opening portion 14, the opening portion 14 releases the closed state of the opening/closing lid 12, and the opening/closing lid 12 becomes rotatable.

As illustrated in FIG. 6, in the antenna device 1 of the present embodiment, in the casing 10, the element accommodation portion 10A is disposed on the hinge 15 (rotation shaft) side that is on the upper side, and the extension shaft member accommodation portion 10B is disposed on the lower side and on the hinge side that is on the lower side. Accordingly, a central axis CL2 of the extension shaft member 20 is located on the hinge 15 side with respect to a central axis CL1 of the casing 10 in a width direction (the left-right direction in FIG. 6) thereof. By shifting the central axis CL2 of the extension shaft member 20 from the central axis CL1 of the casing 10 in the lateral direction in this manner, the opening mechanism accommodation portion 10D can be disposed on the side opposite to the hinge 15 side that is on the upper side in the casing 10, and the power supply cable accommodation portion 10C can be disposed on the side opposite to the hinge 15 side that is on the lower side in the casing 10. In this way, the space in the casing 10 can be effectively utilized.

Figure 7:
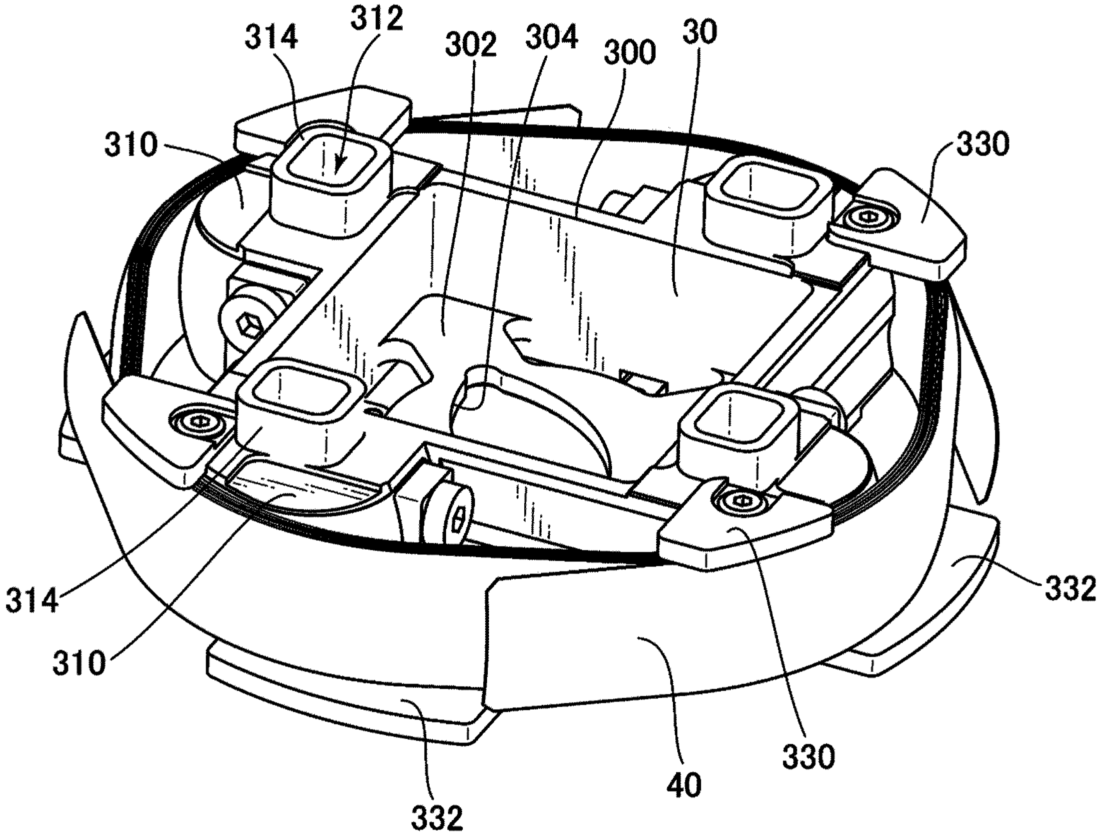
FIG. 7 is a perspective view illustrating a front surface of an element holder.
Figure 8:
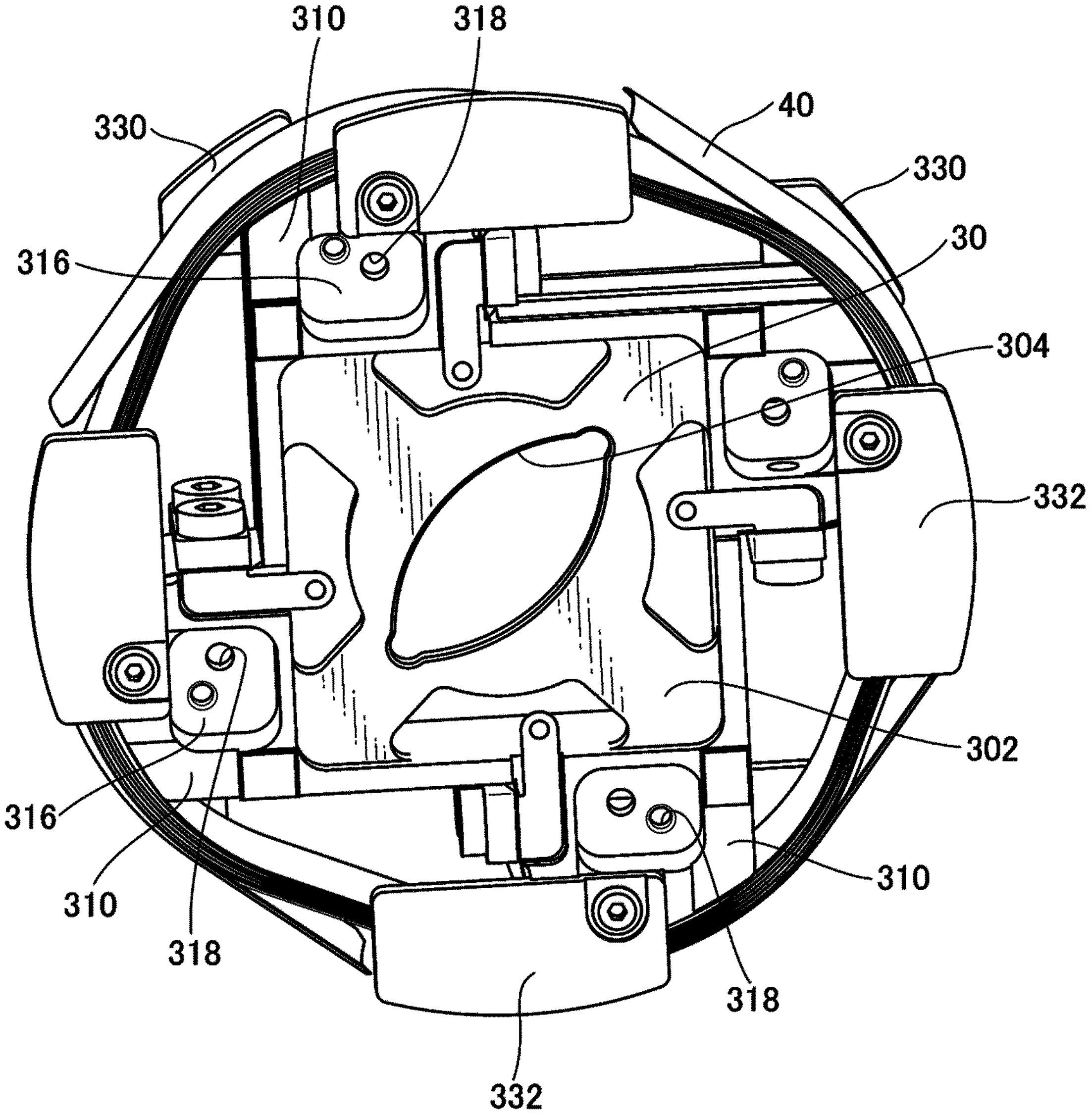
FIG. 8 is a perspective view illustrating a back surface of the element holder.

Next, a basic configuration of the element holder 30 will be described. FIG. 7 is a perspective view illustrating a front surface of the element holder. FIG. 8 is a perspective view illustrating a back surface of the element holder. Here, the front surface of the element holder is a surface on the tip side of the extension shaft member 20, and the back surface of the element holder is a surface on the casing 10 side. FIGS. 7 and 8 illustrate the second element holder. As illustrated in FIGS. 7 and 8, the element holder 30 includes a frame portion 300 at the center, and protruding portions 310 connected to four sides of the frame portion 300, respectively. The protruding portion 310 is formed in the vicinity of one end of each of the sides of the frame portion 300.

The frame portion 300 is a square portion having a predetermined thickness. A flat plate 302 is provided inside the frame portion 300. The opening 304 is formed in the flat plate 302 of the element holder 30. The opening 304 has a line-symmetric shape with respect to one diagonal line as an axis of symmetry, and has a shape obtained by combining two arcs. The shape of the opening 304 corresponds to the shape of the extension shaft member 20 formed by combining a pair of convex tapes. Note that a closing plate 360 (FIG. 8) for closing the opening 304 is attached to the tip side of the first element holder 30. Note that the shape of the frame portion 300 is not limited to the square shape, and may be another polygonal shape, a circular shape, an elliptical shape, or the like.

A front surface convex portion 314 having a substantially rectangular cross section is erected on the front surface of the protruding portion 310. A front surface groove portion 312 having a substantially rectangular cross section is formed in the front surface convex portion 314. Further, a back surface concave portion 316 having a substantially rectangular shape is formed in the back surface of the protruding portion 310 at a position corresponding to the front surface groove portion 312. The shape of the inner side surface of the back surface concave portion 316 corresponds to the shape of the outer side surface of the front surface convex portion 314. In addition, a through hole 318 is formed so as to connect between the front surface groove portion 312 and the back surface concave portion 316.

Although not illustrated in FIGS. 7 and 8, a lid member 340 (FIG. 9) is attached to a bottom portion of the back surface concave portion 316 in the accommodated state. The lid member 340 includes a wide-width portion 342 having a wide width and a narrow-width portion 344 having a narrow width. The wide-width portion 324 has a plate shape and the outer shape thereof is substantially equal to the outer shape of the front surface convex portion 314. Further, the narrow-width portion 344 protrudes from one side of the wide-width portion 342, and has an outer shape substantially equal to the inner shape of the front surface convex portion 314. The lid member 340 includes two through holes 346, and the holding member 50 is fixed to the lid member 340 in a state in which the holding member 50 is inserted through the through holes 346. The lid member 340 is fixed to the bottom portion of the back surface concave portion 316 with screws or the like. As will be described later, when the element holders 30 are stacked in the accommodated state, the lid member 340 is in a state in which the narrow-width portion 344 of the element holder 30 enters into the front surface groove portion 312 of the element holder 30 adjacent thereto, and closes the front surface groove portion 312.

A side surface of the protruding portion 310, on the center side of each of sides of the frame portion 300, is perpendicular to the surface of the frame portion 300 on the radially outer side. A base end portion of the antenna element 40 is fixed to the side surface of each of the protruding portions 310. Further, a surface of each of the protruding portions 310 on the radially outer side is formed in an arc shape.

In addition, a first element guide 330 is attached to the front surface of each of the protruding portions 310. The first element guide 330 is a plate member and protrudes radially outward from the protruding portion 310. In the present embodiment, four of the first element guides 330 are attached to each of the element holders 30. The first element guide 330 is provided at a position corresponding to the center of each of sides of the frame portion 300 so as to extend in the circumferential direction.

In addition, a second element guide 332 is attached to the back surface of the protruding portion 310. The second element guide 332 is a plate member and protrudes radially outward from the protruding portion 310. The thickness of the second element guide 332 is the same as that of the first element guide 330. In the present embodiment, four of the second element guides 332 are attached to each of the element holders 30. The second element guide 332 is provided at a position corresponding to the corner of each of sides of the frame portion 300. The first element guide 330 and the second element guide 332 are shaped and arranged so as not to overlap each other when viewed in the axial direction.

Note that the configurations of the first to fourth element holders need not necessarily be the same. For example, the thickness of the flat plate 302 may be the same as the thickness of the frame portion 300. Further, a cylindrical guide portion that guides the extension shaft member 20 may be provided along the periphery of the opening 304.

Hereinafter, a configuration of the antenna device in the accommodated state will be described.

As illustrated in FIGS. 3 to 5, in the accommodated state, the opening/closing lid 12 is closed, and an upper portion of the element accommodation portion 10A is closed. The extension shaft member 20 is housed in the extension shaft member accommodation portion 10B in a state in which the extension shaft member 20 is wound around the shaft portion 18A of the extension shaft member accommodation device 18 and drawn back (retracted). A tip portion of the extension shaft member 20 enters into the element accommodation portion 10A, and the tip thereof is in contact with the opening/closing lid 12. In this state, the rotation of the shaft portion 18A of the extension shaft member accommodation device 18 is restricted. Since the extension shaft member 20 is formed by joining the two convex tapes, when the extension shaft member 20 is flatly wound around the shaft portion 18A of the extension shaft member accommodation device 18, a restoring force is generated, and a force that causes the extension shaft member 20 to extend upward from the extension shaft member accommodation device 18 is generated.

In addition, in the accommodated state, the power supply cable 62 is spirally wound and accommodated in the power supply cable accommodation portion 10C. The tip of the power supply cable 62 extends to the element accommodation portion 10A, passes through the opening of the element holder 30, and reaches the power supply board 60 fixed to the second element holder 30.

Figure 9:
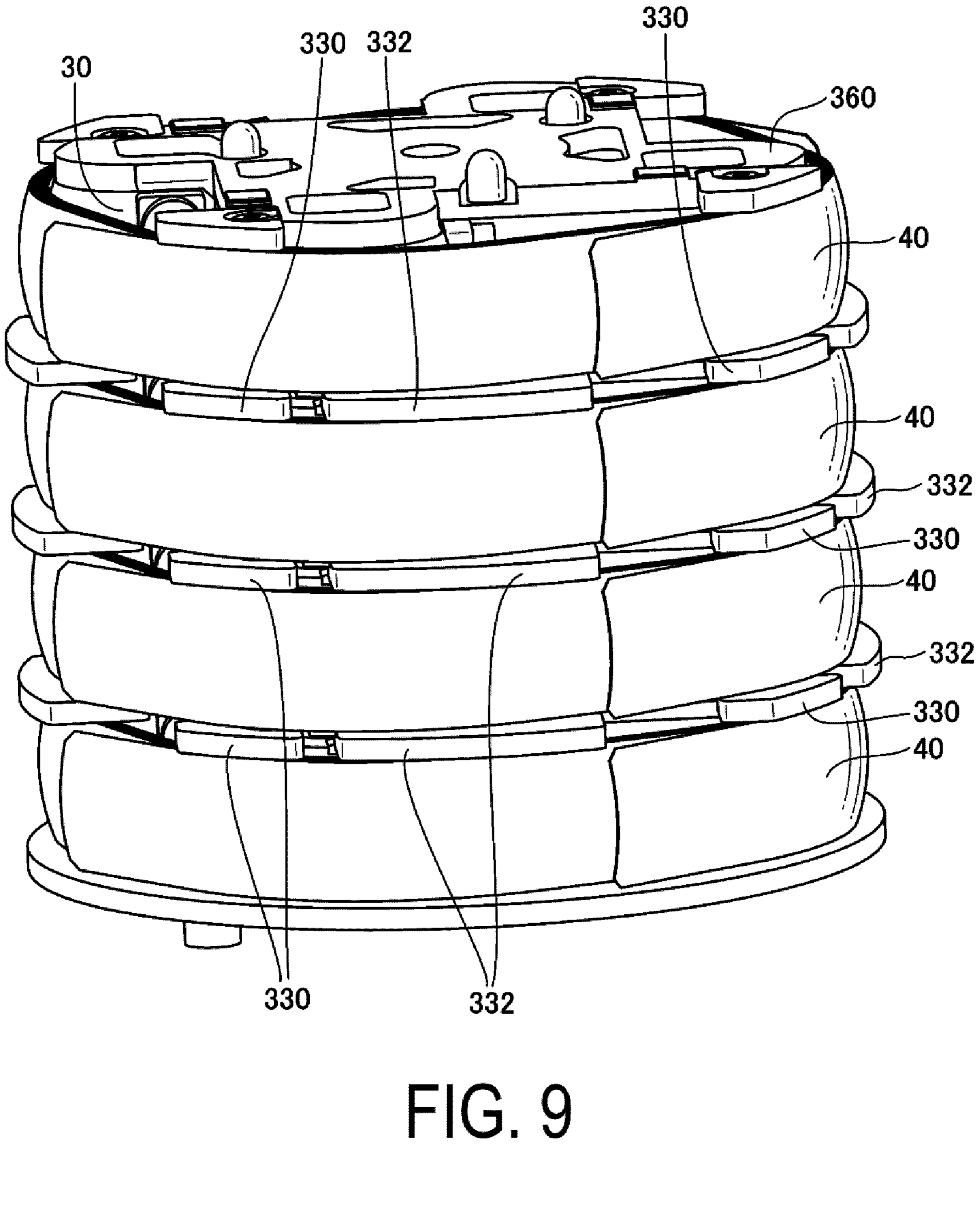
FIG. 9 is a perspective view illustrating a plurality of the element holders in the accommodated state.
Figure 10:
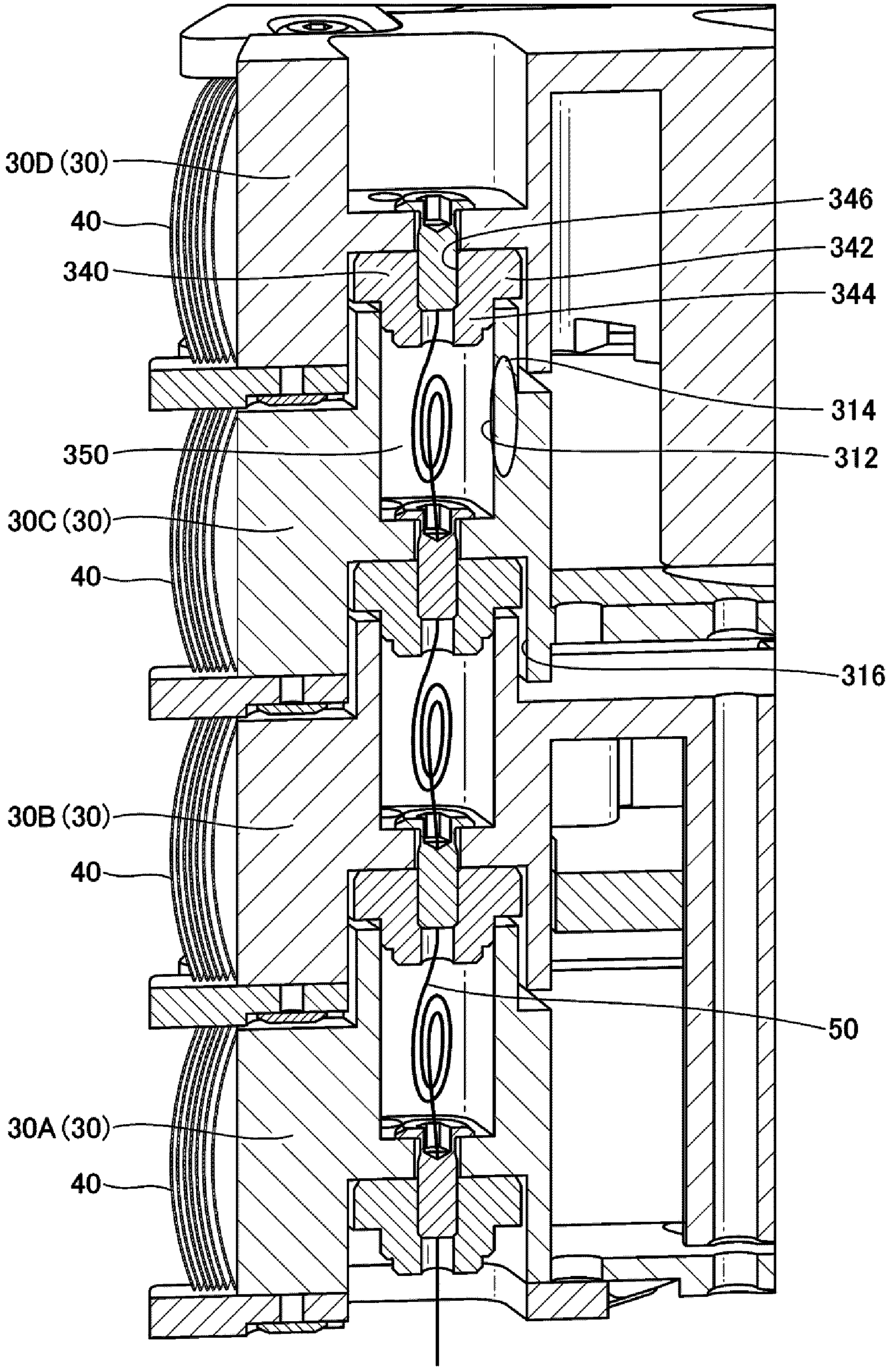
FIG. 10 is an enlarged vertical cross-sectional view of the element holders in the accommodated state.

FIG. 9 is a perspective view illustrating the plurality of element holders in the accommodated state. FIG. 10 is an enlarged vertical cross-sectional view of the element holders in the accommodated state. As illustrated in FIG. 9, the plurality of element holders 30 are accommodated in a stacked state in the element accommodation portion 10A. As illustrated in FIG. 10, adjacent ones of the element holders 30 are stacked in a state in which the front surface convex portion 314 of one (the lower one) of the element holders 30 is inserted into the back surface concave portion 316 of the other (the upper one) of the element holders 30. In this way, the lid member 340 attached to the bottom portion of the back surface concave portion 316 of the other element holder 30 closes the front surface groove portion 312 of the element holder 30 adjacent to the other element holder 30. As a result, a housing portion 350 of the holding member 50 is formed in a space surrounded by the front surface groove portion 312 and the lid member 340. A portion of the holding member 50 located between adjacent ones of the element holders 30 is housed in the housing portion 350, for example, in a spirally wound state.

Further, as described above, the first element guides 330 and the second element guides 332 are provided so as not to interfere with each other. In this way, the second element guides 332 of one of the stacked element holders 30 adjacent to each other are positioned between the first element guides 330 of the other of the stacked element holders 30 adjacent to each other. As a result, adjacent ones of the element holders 30 are stacked so as to be in closer proximity to each other.

The antenna element 40 is held in a state of being wound around the outer peripheral surface of the element holder 30 in the radial direction thereof. The antenna element 40 has a circular shape as a result of being wound along the outer peripheral surface of the protruding portion 310 of the element holder 30. Further, the antenna element 40 is guided along the outer peripheral surface of the element holder 30 by the first element guides 330 and the second element guides 332. Each of the antenna elements 40 is held in a retracted state around the element holder 30, as a result of a tip portion of the antenna element 40 abutting the inner wall of the element accommodation portion 10A. Since the antenna element 40 is formed of the convex tape, the antenna element 40 can be deployed outward from the element holder 30.

In the accommodated state, the element holders 30 are stacked and accommodated in the element accommodation portion 10A. In this state, the element holders 30 are urged toward the opening by the spring 13 attached to the bottom portion of the element accommodation portion 10A. Further, in the extension shaft member 20, the force is generated that causes the extension shaft member 20 to extend upward.

Next, the transition of the antenna device from the accommodated state to the deployed state will be described.

When the antenna device 1 transitions to the deployed state, first, a signal for instructing the transition to the deployed state is transmitted to the opening portion drive substrate 16 from a control device of the artificial satellite. Upon receiving the signal, the opening portion drive substrate 16 drives the opening portion 14, and the opening portion 14 releases the closed state of the opening/closing lid 12, and the opening/closing lid 12 becomes rotatable. Further, in conjunction with this, a lock member of the extension shaft member accommodation device 18 releases the restriction of the rotation of the shaft portion.

When the opening/closing lid 12 becomes rotatable, the opening/closing lid 12 is opened by a spring (not illustrated) provided in the hinge 15. At the same time, the extension shaft member 20 holds the restoring force that causes the extension shaft member 20 to return to the linear shape, as described above, and the extension shaft member 20 extends outward from the casing 10 due to the restoring force. In addition, the element holders 30 are released outward from the casing 10 by the restoring force of the extension shaft member 20 and the spring force of the assist spring 13, thereby causing the extension shaft member 20 to extend outward from the casing 10 and the element holders 30 to be released outward from the casing 10.

When the extension shaft member 20 extends, the first element holder 30 extends outward. Since each of the element holders 30 is fixed to the holding member 50, the element holders 30 are pulled by the holding member 50 and move along the extension shaft member 20.

Then, the extension of the extension shaft member 20 stops when the holding member between the element holders 30 and between the fourth element holder 30 and the casing 10 is in a tensioned state. When the holding member 50 is in the tensioned state in this manner, the element holders 30 are positioned at the predetermined intervals determined by design.

Further, when the element holder 30 is released from the element accommodation portion 10A, the restriction on the antenna elements 40 wound around the outer peripheral surface of the element holder 30 is released. Since the antenna element 40 is formed of the convex tape, the antenna element 40 is deployed to be in a state of extending outward from each of the element holders 30.

In the deployed state of the antenna device, the extension shaft member 20 extends linearly from the inside of the casing 10. An excess length remains in a base end portion of the extension shaft member 20, and this excess length is wound around the shaft portion 18A of the extension shaft member accommodation device 18. Accordingly, a force acts on the extension shaft member 20 in a direction that causes the extension shaft member 20 to extend. Further, since the force acts in the direction that causes the extension shaft member 20 to extend, the holding member 50 between the element holders 30 is in the tensioned state. As a result, the intervals between the plurality of element holders 30 are set to the predetermined intervals.

According to the present embodiment, the following effects are obtained.

In order to realize sufficient transmission/reception performance of the antenna device, the extension shaft member 20 and the antenna elements 40 need to protrude to a great extent. On the other hand, if the antenna device is deployed at the time of launching the artificial satellite, the size of the entire device is increased and downsizing of the artificial satellite cannot be realized. Further, since the antenna device 1 performs its function after being released into outer space, the antenna device 1 does not need to be deployed before the release. On the other hand, unless the antenna device 1 is reliably deployed in outer space, the function as an artificial satellite is not performed. Thus, a reliable deployment operation based on a simple deployment method is required. Furthermore, even if the constituent elements constituting the antenna device are accommodated at the time of the launch in order to realize the downsizing, the space used for accommodating the constituent elements becomes a wasteful space after the deployment. Thus, the accommodation space needs to be made as small as possible. Then, as described above, in order to achieve the performance of the antenna device 1, the antenna elements 40 need to be arranged at designed intervals. In contrast, according to the present embodiment, since the antenna device 1 includes the holding member 50 that couples the plurality of element holders 30 to each other, the intervals between the plurality of element holders 30 in the deployed state are held at the predetermined intervals. As a result, the antenna elements are positioned at designed predetermined intervals and function as an antenna.

In addition, according to the present embodiment, since the holding member 50 is made of the string, the holding member 50 can be accommodated in a small accommodation portion in the accommodated state.

In addition, according to the present embodiment, the extension shaft member 20 is formed of the convex tapes. As a result, the extension shaft member 20 can be deployed from the accommodated state in which the extension shaft member 20 is wound up, to the deployed state in which the extension shaft member 20 extends linearly, with a simple configuration without requiring other power.

In addition, according to the present embodiment, the extension shaft member 20 is formed by superposing the pair of convex tapes so as to face each other. As a result, the extension shaft member 20 reliably extends linearly, and the restoring force thereof also increases.

In addition, according to the present embodiment, the antenna device 1 includes the power supply board 60 disposed at the second element holder 30. By disposing the power supply board 60 at the element holder 30 in this manner, the antenna device 1 can be made compact.

In addition, according to the present embodiment, the antenna device 1 includes the power supply cable 62 extending from the casing 10 to the power supply board 60, and the power supply cable 62 is disposed along the extension shaft member 20. As a result, when the extension shaft member 20 is deployed and extends linearly, the power supply cable 62 extends along the extension shaft member 20.

In addition, according to the present embodiment, the antenna element 40 includes the convex tape. As a result, the antenna element 40 can be deployed from the accommodated state in which the antenna element 40 is wound up, to the deployed state in which the antenna element 40 extends linearly, with a simple configuration without requiring other power.

In addition, according to the present embodiment, the opening mechanism accommodation portion 10D and the element accommodation portion 10A are provided in an upper portion of the casing 10. As a result, the space in the casing 10 can be effectively utilized, and the antenna device 1 can be made compact.

In addition, according to the present embodiment, the power supply cable accommodation portion 10C and the extension shaft member accommodation portion 10B are provided in a lower portion of the casing 10. As a result, the space in the casing 10 can be effectively utilized, and the antenna device 1 can be made compact.

In addition, according to the present embodiment, the central axis of the extension shaft member 20 is located on the hinge 15 (rotation shaft) side of the opening/closing lid 12 with respect to the central axis of the casing 10. As a result, the opening mechanism accommodation portion 10D and the element accommodation portion 10A can be provided in the upper portion of the casing 10, and the power supply cable accommodation portion 10C and the extension shaft member accommodation portion 10B can be provided in the lower portion of the casing 10.

In addition, according to the present embodiment, the element holders 30 are fixed to the holding member 50 such that the distances between the locations at which adjacent ones of the element holders 30 are attached to the holding member 50 are the preset intervals. As a result, the antenna elements 40 attached to the element holder 30 are arranged at designed positions, and desired antenna performance is realized. Furthermore, since a part of the extension shaft member 20 is held in the extension shaft member accommodation portion 10B without being extended and holds the extending force for extending in the axial direction, the string, that is, the holding member 50 is always kept in the tensioned state, and because of the above-described extending force, the string does not sag. Thus, the set predetermined intervals can be stably maintained.

REFERENCE SIGNS LIST

1 Antenna device
10 Casing
10A Element accommodation portion
10B Extension shaft member accommodation portion
10C Power supply cable accommodation portion
10D Opening mechanism accommodation portion
11 Casing main body
12 Opening/closing lid
13 Spring
14 Opening portion
15 Hinge
16 Opening portion drive substrate
18 Extension shaft member accommodation device
18A Shaft portion
18B Coupling member
20 Extension shaft member
20A Convex tape
30, 30A, 30B, 30C, 30D Element holder
40 Antenna element
50 Holding member
60 Power supply board
62 Power supply cable
300 Frame portion
302 Flat plate
304 Opening
310 Protruding portion
312 Front surface groove portion
314 Front surface convex portion
316 Back surface concave portion
318 Through hole
324 Wide-width portion
330 First element guide
332 Second element guide
340 Lid member
342 Wide-width portion
344 Narrow-width portion
346 Through hole
350 Housing portion

The invention claimed is:

1. An antenna device capable of being in an accommodated state of being accommodated in a casing and in a deployed state of extending to an outside from the casing, the antenna device comprising:
- an extension shaft member accommodated in the casing in a state of being retracted from a casing opening of the casing in an axial direction;
- a plurality of element holders including element holder openings and stacked in the casing in a state of the extension shaft member being inserted through the element holder openings;
- an antenna element deployably held by an element holder of the plurality of element holders; and
- a holding member configured to couple the plurality of element holders to each other.

2. The antenna device according to claim 1, wherein: the holding member is formed of a string.

3. The antenna device according to claim 1, wherein; the extension shaft member is formed of at least one piece of convex tape.

4. The antenna device according to claim 3, wherein: the at least one piece of convex tape includes a pair of pieces of convex tape, and the extension shaft member is formed by superposing the pair of pieces of convex tape so as to face each other.

5. The antenna device according to claim 1, further comprising a power supply board disposed at at least one of the element holders.

6. The antenna device according to claim 5, further comprising a power supply cable extending from the casing to the power supply board, wherein: the power supply cable is disposed along the extension shaft member.

7. The antenna device according to claim 1, wherein the antenna element includes a convex tape.

8. The antenna device according to claim 1, wherein: the casing includes: a casing main body including an opening on one side of the casing main body; and an opening/closing lid rotatably connected to the casing main body and capable of closing the opening, and a central axis of the extension shaft member is displaced from a central axis of the casing.

9. The antenna device according to claim 1, wherein: an opening mechanism accommodation portion and an element accommodation portion are formed in the casing, the opening mechanism accommodation portion housing an opening portion configured to open an opening/closing lid, and the element accommodation portion housing the element holders, and the opening mechanism accommodation portion and the element accommodation portion are provided in an upper portion of the casing.

10. The antenna device according to claim 1, wherein; a power supply cable accommodation portion and an extension shaft member accommodation portion are formed in the casing, the power supply cable accommodation portion housing a power supply cable configured to supply power to a power supply board attached to the antenna element, and the extension shaft member accommodation portion housing the extension shaft member, and the power supply cable accommodation portion and the extension shaft member accommodation portion are provided in a lower portion of the casing.

11. The antenna device according to claim 9, wherein a central axis of the extension shaft member is closer than a central axis of the casing to a rotation shaft of the opening/closing lid.

12. The antenna device according to claim 1, wherein the element holders are fixed to the holding member to cause a distance between locations at which the element holders adjacent to each other are attached to the holding member to be a preset interval.

13. An artificial satellite comprising the antenna device according to claim 1.

* * * * *